United States Patent
Minakawa et al.

(10) Patent No.: US 10,963,198 B2
(45) Date of Patent: Mar. 30, 2021

(54) COMMUNICATION APPARATUS THAT PROVIDES A COMMUNICATION PARAMETER AND METHOD OF CONTROLLING THE SAME

(71) Applicant: CANON KABUSHIKI KAISHA, Tokyo (JP)

(72) Inventors: Atsushi Minakawa, Kawasaki (JP); Hiroki Habu, Tama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/223,389

(22) Filed: Dec. 18, 2018

(65) Prior Publication Data

US 2019/0196761 A1  Jun. 27, 2019

(30) Foreign Application Priority Data

Dec. 22, 2017  (JP) .............................. JP2017-246401

(51) Int. Cl.
| | | |
|---|---|---|
| *G06F 3/12* | (2006.01) | |
| *H04N 1/00* | (2006.01) | |
| *H04N 1/44* | (2006.01) | |
| *H04W 12/00* | (2021.01) | |

(52) U.S. Cl.
CPC .......... *G06F 3/1236* (2013.01); *G06F 3/1222* (2013.01); *G06F 3/1238* (2013.01); *G06F 3/1284* (2013.01); *G06F 3/1292* (2013.01); *H04N 1/00307* (2013.01); *H04N 1/00334* (2013.01); *H04N 1/4433* (2013.01); *H04W 12/003* (2019.01)

(58) Field of Classification Search
None
See application file for complete search history.

(56) References Cited

U.S. PATENT DOCUMENTS

| 7,478,755 B2 | 1/2009 | Sekiguchi | |
|---|---|---|---|
| 2006/0208088 A1* | 9/2006 | Sekiguchi | G06K 7/1095 235/472.02 |
| 2014/0045472 A1* | 2/2014 | Sharma | H04W 4/08 455/416 |
| 2017/0034768 A1* | 2/2017 | Kimura | H04W 48/10 |

(Continued)

FOREIGN PATENT DOCUMENTS

JP  2006261938 A  9/2006

*Primary Examiner* — Miya J Williams
(74) *Attorney, Agent, or Firm* — Rossi, Kimms & McDowell LLP (57) ABSTRACT

In order to enable a reduction in complexity in setting a communication parameter, a communication apparatus operable to provide a communication parameter to an external apparatus, generates a first image that is used in a first setting scheme for providing a communication parameter and in which information including a communication parameter is encoded; and generates a second image that is used in a second setting scheme for providing a communication parameter and in which information that does not include the communication parameter and that does include authentication information for performing an authentication is encoded. Then, the apparatus accepts information used to determine which of the first setting scheme and the second setting scheme to use; and, displays, based on the information, either the first image or the second image.

10 Claims, 9 Drawing Sheets

(56) References Cited

U.S. PATENT DOCUMENTS

| | | | |
|---|---|---|---|
| 2017/0238164 A1* | 8/2017 | Pang | H04W 8/005 |
| | | | 455/41.3 |
| 2017/0277496 A1* | 9/2017 | Mihira | G06F 3/1236 |
| 2018/0069718 A1* | 3/2018 | Terao | H04L 12/28 |
| 2018/0077255 A1* | 3/2018 | Goto | H04W 76/14 |
| 2018/0109381 A1* | 4/2018 | Cammarota | H04L 9/0894 |
| 2018/0167208 A1* | 6/2018 | Le Saint | H04L 63/0442 |
| 2018/0184296 A1* | 6/2018 | Hunt | G06K 7/1417 |
| 2018/0260175 A1* | 9/2018 | Watanabe | G06F 3/1204 |
| 2019/0306919 A1* | 10/2019 | Miyake | G06F 3/1204 |
| 2020/0220718 A1* | 7/2020 | Tsuji | H04N 1/4413 |

* cited by examiner

COMMUNICATION APPARATUS THAT PROVIDES A COMMUNICATION PARAMETER AND METHOD OF CONTROLLING THE SAME

BACKGROUND OF THE INVENTION

Field of the Invention

The present invention relates to a technique for parameter setting in a communication apparatus.

Description of the Related Art

In recent years, there is an increasing number of cases in which a wireless communication function is installed in electric devices such as a digital camera, a printer, a portable phone/smart phone or the like and such devices are connected to a wireless network and used as a communication apparatus. To connect the electric device to a wireless network, it is necessary to set various communication parameters such as an encryption scheme, an encryption key, an authentication scheme, an authentication key, or the like. Accordingly, communication parameter setting is complicated, and there is a high threshold for the user of a digital camera or printer. Thus, mechanisms for simplifying communication parameter setting are used. Furthermore, to prevent communication parameter information leakage or the like, a mechanism is used in which a user terminal is notified of communication parameters encrypted by using a public key encryption scheme.

Japanese Patent Laid-Open No. 2006-261938 discloses a technique in which by using a QR code (registered trademark) image including information of communication parameters, communication parameter setting in a communication terminal is simplified. Also, Wi-Fi (registered trademark) Alliance is investigating a DPP scheme in which information of a public key is provided to a communication terminal via a QR code image or the like, and communication parameters are provided to a communication terminal connected by a communication channel for which the public key is used. DPP is an abbreviation of Device Provisioning Protocol.

However, in a case where there are multiple setting schemes for communication parameters using a QR code image, a QR code image ends up being displayed for every one of the schemes. For example, in a communication apparatus that supports two setting schemes, two QR code images end up being displayed. For that reason, the user ends up being confused as to which QR code image they should capture.

SUMMARY OF THE INVENTION

According to one aspect of the present invention, a communication apparatus operable to provide a communication parameter to an external apparatus, comprises: a first generation unit configured to generate a first image that is used in a first setting scheme for providing a communication parameter and in which information including a communication parameter is encoded; a second generation unit configured to generate a second image that is used in a second setting scheme for providing a communication parameter and in which information that does not include the communication parameter and that does include authentication information for performing an authentication is encoded; an acceptance unit configured to accept information used to determine which of the first setting scheme and the second setting scheme to use; and a display unit configured to, based on the information accepted by the acceptance unit, display either the first image or the second image.

The present invention provides a technique that enables reduction of complexity in communication parameter setting.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Explanation is given in detail below, with reference to the drawings, of examples of embodiments of the invention. Note, the following embodiments are only examples and are not intended to limit the scope of present invention.

First Embodiment

As a first embodiment of a communication apparatus according to the present invention, an example will be described below of a printer that forms a network based on wireless LAN conforming to the IEEE 802.11 series and accepts a wireless connection from a mobile device.

System Configuration and an Apparatus Configuration

Figure 1:
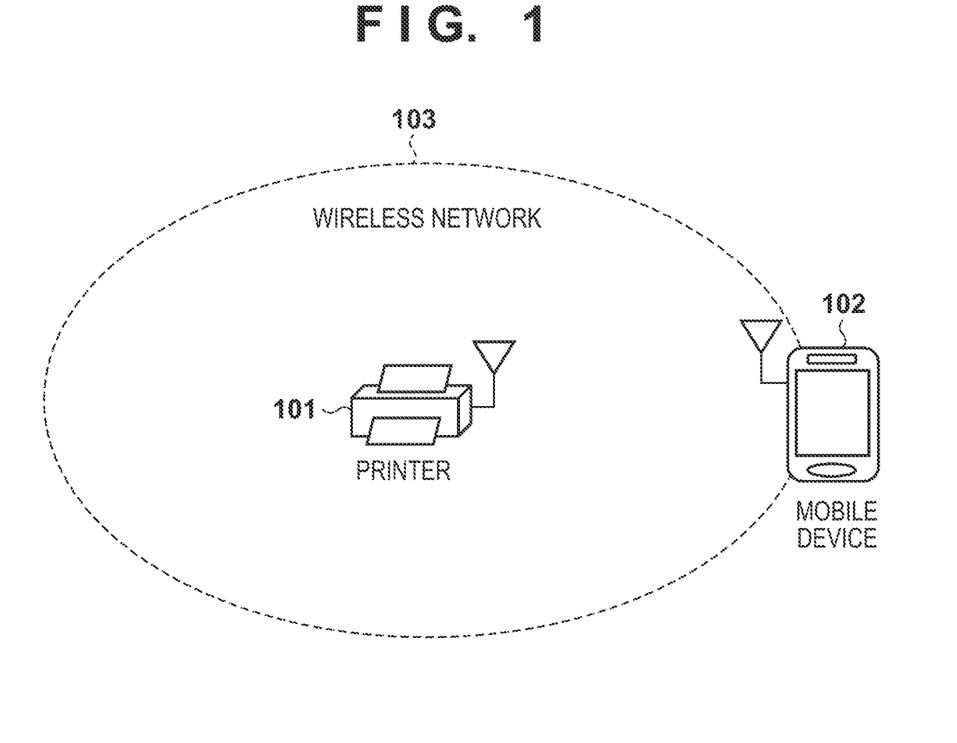
FIG. 1 is a view illustrating an overall configuration of a communication system according to a first embodiment.

FIG. 1 is a view illustrating an overall configuration of a communication system according to a first embodiment. The communication system includes a printer 101 that forms a wireless network 103 and a mobile device 102 that connects to the wireless network 103.

The printer 101 has a wireless LAN function, and operates as a configurator or an access point as specified in DPP, for example. The printer 101 can form the wireless network 103 as an access point. Also, it can provide communication parameters for connecting to the wireless network 103 that it forms itself as the configurator. Here, in the communication parameters, setting items necessary for performing wireless communication such as an SSID (Service Set Identifier) as a network identifier, an encryption scheme, an encryption key, and an authentication scheme are included. The printer 101 can generate a code image in which communication parameters are encoded and a code image in which a public key that is used in DPP is encoded. In the following description, use of a QR code image as a code image is envisioned.

The mobile device 102 has a wireless LAN function and operates as an enrollee as specified in DPP, for example. Also, the mobile device 102 has a camera and can capture the surroundings of the mobile device 102. Here, it is envisioned that in the mobile device 102, a setting app for setting parameters of the wireless LAN of the mobile device 102 is installed, and the setting app controls the camera to capture the surroundings. The mobile device 102, by capturing a QR code image that the printer 101 displays with a camera, can obtain encoded information, in other words communication parameters for connecting to the wireless network 103 and a public key used in DPP.

Note that in the following description, description is given using a printer as a device for forming a wireless network and a mobile device as a device that connects to the wireless network, but limitation is not made to this. In other words, any communication apparatus having a wireless network function may be used and it need not be portable. Also, a communication apparatus such as a portable phone, a digital camera, a video camera, a PC, a PDA, a smart phone, or a smart watch can be used as the mobile device, but limitation is not made to these.

Figure 2:
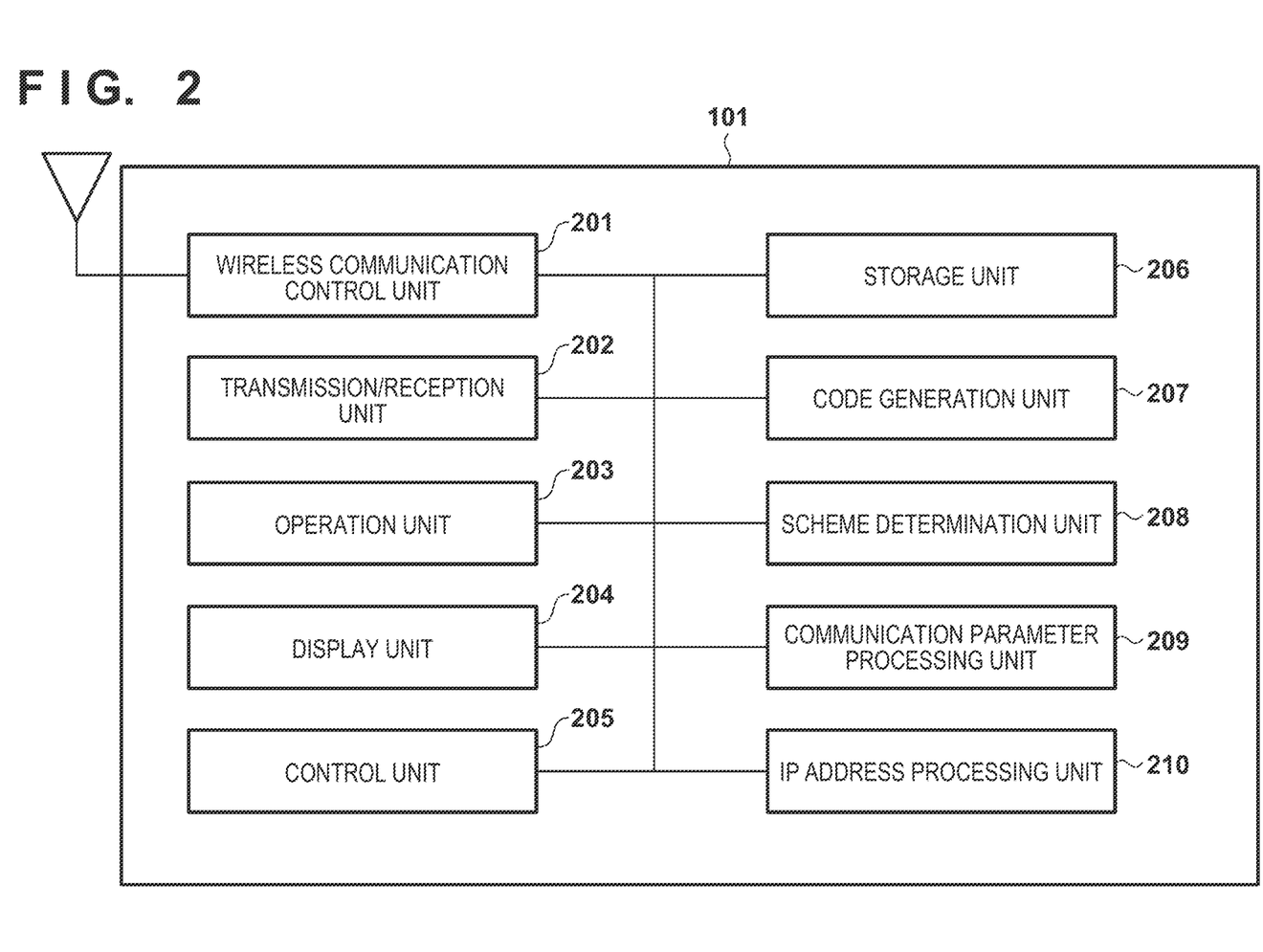
FIG. 2 is a block diagram illustrating a functional configuration of a printer.

FIG. 2 is a block diagram illustrating a functional configuration of the printer 101. Here, it is envisioned that each functional unit is realized by a computer (processor) executing a program stored in the memory. However, some or all of the respective functions may be realized by dedicated hardware.

A wireless communication control unit 201 controls communication that uses an antenna and circuitry or the like for performing transmission/reception of wireless signals with another wireless apparatus via a wireless LAN. A transmission/reception unit 202 performs control to transmit/receive data according to a protocol of each communication layer.

An operation unit 203 accepts operations for the printer 101 from a user. A button for starting processing for connecting to a wireless network and the like is included in the operation unit 203. Note that the operation unit 203 may be configured by hardware (physical buttons, switches, and the like) and may be configured by a UI provided by software using a display unit 204. The display unit 204 outputs information that can be recognized visually/aurally, such as an LCD, an LED, or a speaker, and makes notifications of various information to the user.

A control unit 205 is configured by one or more processors such as a CPU, and controls the printer 101 as a whole. A storage unit 206 comprises one or more ROMs in which programs and data for controlling the printer 101 are stored and one or more RAMs for performing temporary storage. Various operations of later-described flowcharts are realized by executing control programs stored in the storage unit 206 to control respective functional units.

A code generation unit 207 generates a QR code image. Note that a QR code image is used as an image for code information, but a barcode image, another two-dimensional code image, or the like may be used.

A scheme determination unit 208 determines a setting scheme that a user selected via the operation unit 203. Here, the setting scheme means a scheme for providing wireless LAN parameters to an external device (for example, the mobile device 102). Here, a "legacy scheme" and a "DPP scheme" are envisioned to be available as setting schemes.

Here, the legacy scheme is a scheme that allows connection by providing to an external device a QR code image obtained by encoding information including communication parameters. Also, the DPP scheme is a scheme that allows connection by providing to an external device a QR code image obtained by encoding information including a public key (specific to the printer 101) that is related to the printer 101. Specifically, the external device transmits an authentication request to the printer 101 using the obtained public key, and receives communication parameters from the printer 101 via an encrypted communication channel. In other words, the public key included in the QR code image is used as authentication information for performing authentication.

Note that another setting scheme may be used. For example, a scheme that allows connection by providing to an external device a QR code image obtained by encoding information necessary for connection in Wi-Fi Direct (registered trademark) or the like may be used.

A communication parameter processing unit 209 performs processing for providing communication parameters for connecting to the wireless network 103. An IP address processing unit 210 performs processing for setting the IP address of the printer 101 itself and processing for distributing the IP address to the mobile device 102 that connects to the wireless network 103.

Note that the respective role assignments of each of the above-described functional units are mere examples. Two or more of the above-described functional units may be configured as one functional unit, and one of the above-described functional units may be configured as two or more functional units.

Apparatus Operation

Figure 3:
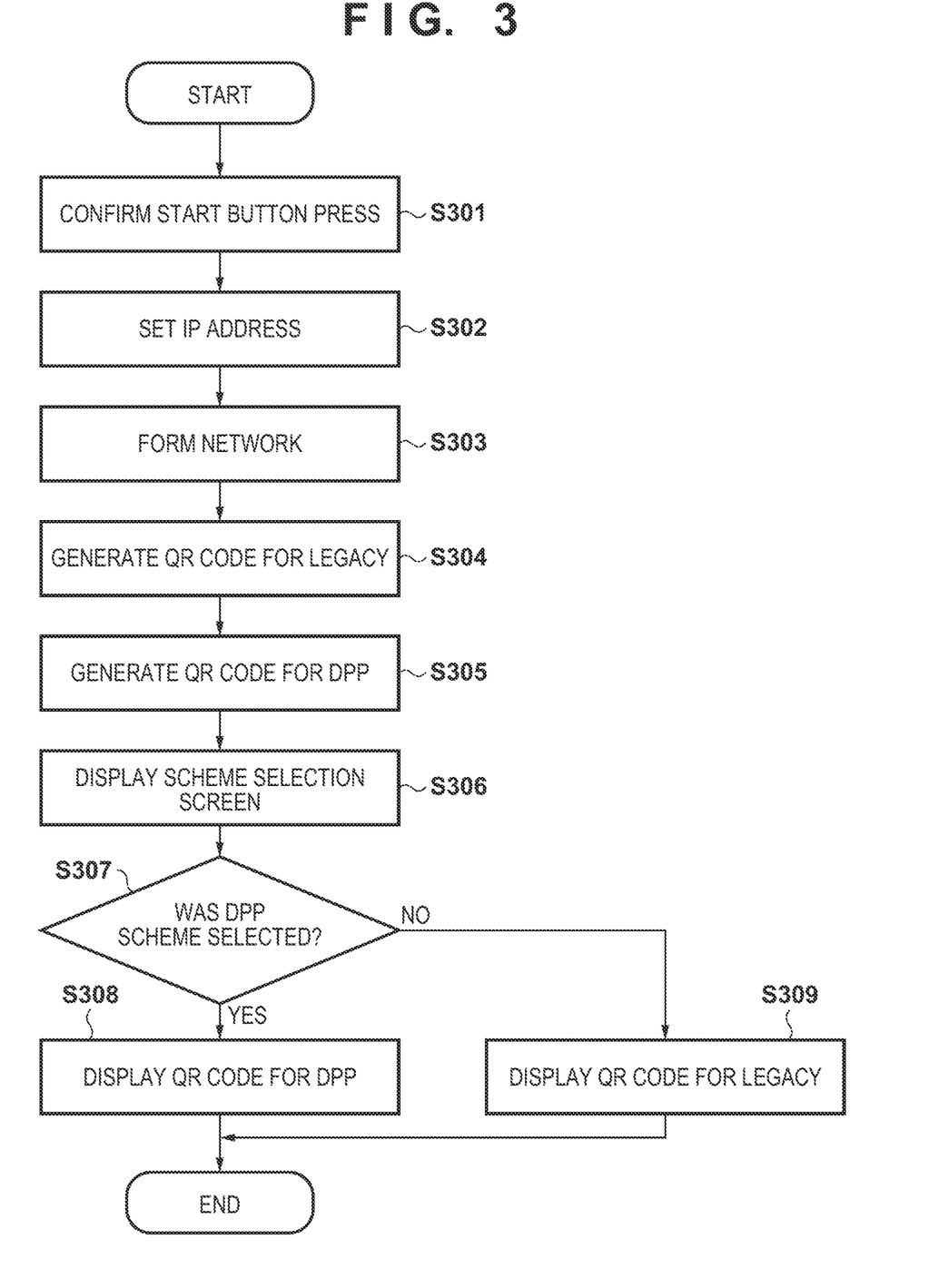
FIG. 3 is a flowchart of QR code image display processing in the first embodiment.

FIG. 3 is a flowchart of QR code image display processing in the first embodiment. Specifically, it is processing in which the printer 101, which provides communication parameters, displays a QR code image based on a setting scheme that a user selected. The processing of FIG. 3 is started when the printer 101 accepts an instruction to start processing for connecting to a wireless network from a user via the operation unit 203. Note that in the first embodiment, description is given of a case where when the mobile device 102 starts setting of communication parameters, the printer 101 has not yet formed the wireless network 103.

In step S301, the printer 101 confirms that a button for starting processing for connecting to the wireless network was pressed by a user. When the start instruction from the user is confirmed, the processing advances to step S302.

In step S302, the printer 101 controls the IP address processing unit 210 and sets the IP address to the printer 101 itself. Here, something set in advance by the user may be used for the IP address, and something that the printer 101 autonomously decided may be used.

In step S303, the printer 101 controls the wireless communication control unit 201 to form the wireless network 103, and start operation as an access point. Note that the operation as an access point in step S303 includes starting operation as a P2P Group Owner in a case where Wi-Fi Direct is executed. Here, for parameters for the wireless network 103 such as an SSID (Service Set Identifier), an encryption scheme, an encryption key, and an authentication scheme, parameters that are set in advance by the user may be used, and parameters that the printer 101 decides autonomously may be used.

In step S304, the printer 101 controls the code generation unit 207 to generate a QR code image for the legacy scheme. In step S305, the printer 101 controls the code generation unit 207 to generate a QR code image for the DPP scheme. Note that the order of execution of step S304 and step S305 may be reversed. Furthermore, configuration may be taken so that the QR code image is generated after the determination processing in later-described step S307.

Figure 4:
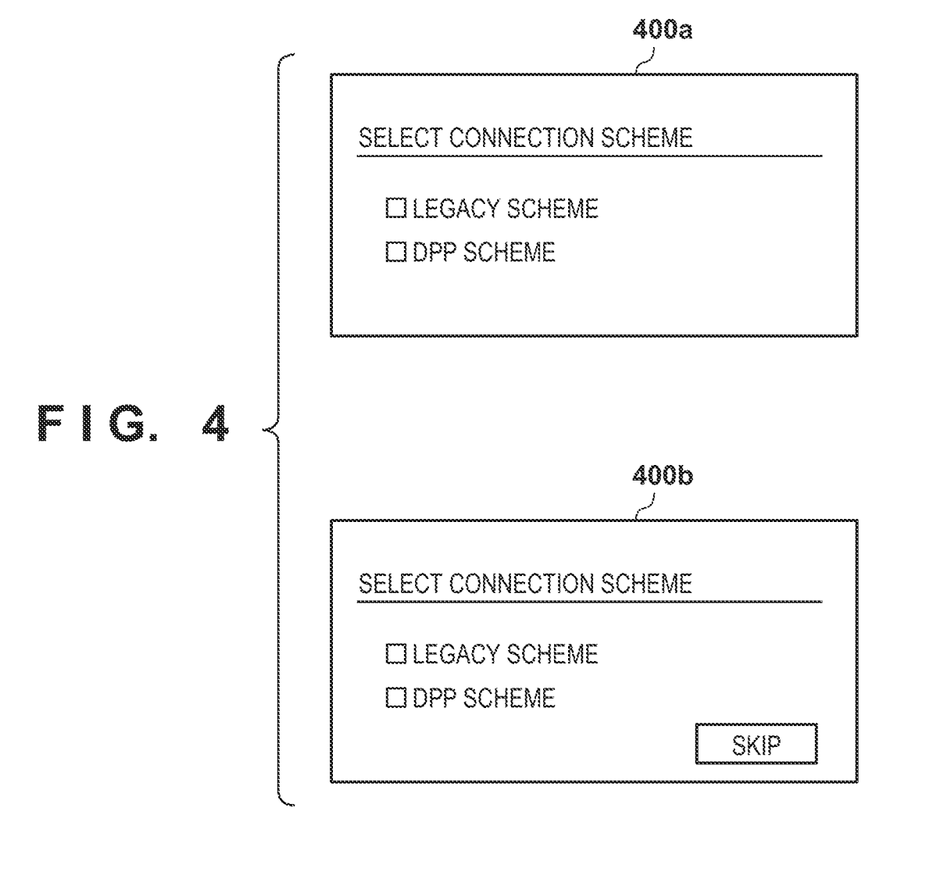
FIG. 4 is a view illustrating an example of a setting scheme selection screen.

In step S307, the printer 101 controls the display unit 204 to display a selection screen for accepting from the user which of the legacy scheme and the DPP scheme to allow connection by. The screen 400a illustrated in FIG. 4 is a view that illustrates an example of a screen for selecting a setting scheme displayed on the display unit 204.

In step S307, the printer 101 determines which of the legacy scheme and the DPP scheme was selected on the selection screen. In a case where the DPP scheme was determined to be selected (YES in step S307), the processing advances to step S308, and in the case where the legacy scheme was determined to be selected (NO in step S307), the processing advances to step S309.

In step S308, the printer 101 controls the display unit 204 and displays on the display unit 204 the QR code image for the DPP scheme generated in step S305. Meanwhile, in step S309, the printer 101 controls the display unit 204 and displays on the display unit 204 the QR code image for the legacy scheme generated in step S304.

By the foregoing processing, only one QR code image ends up being displayed on the display unit 204 of the printer 101. Accordingly, the user of the mobile device 102 can perform communication parameter setting on the mobile device 102 by capturing the one displayed QR code image by using the mobile device 102.

Note that configuration may be taken such that in the case where a QR code image is generated after the determination processing in step S307, only the QR code image for the determined scheme is generated. By this, it becomes possible to reduce the processing load for generating the QR code image since it is possible to reduce the number of QR code images that are generated.

Figure 5:
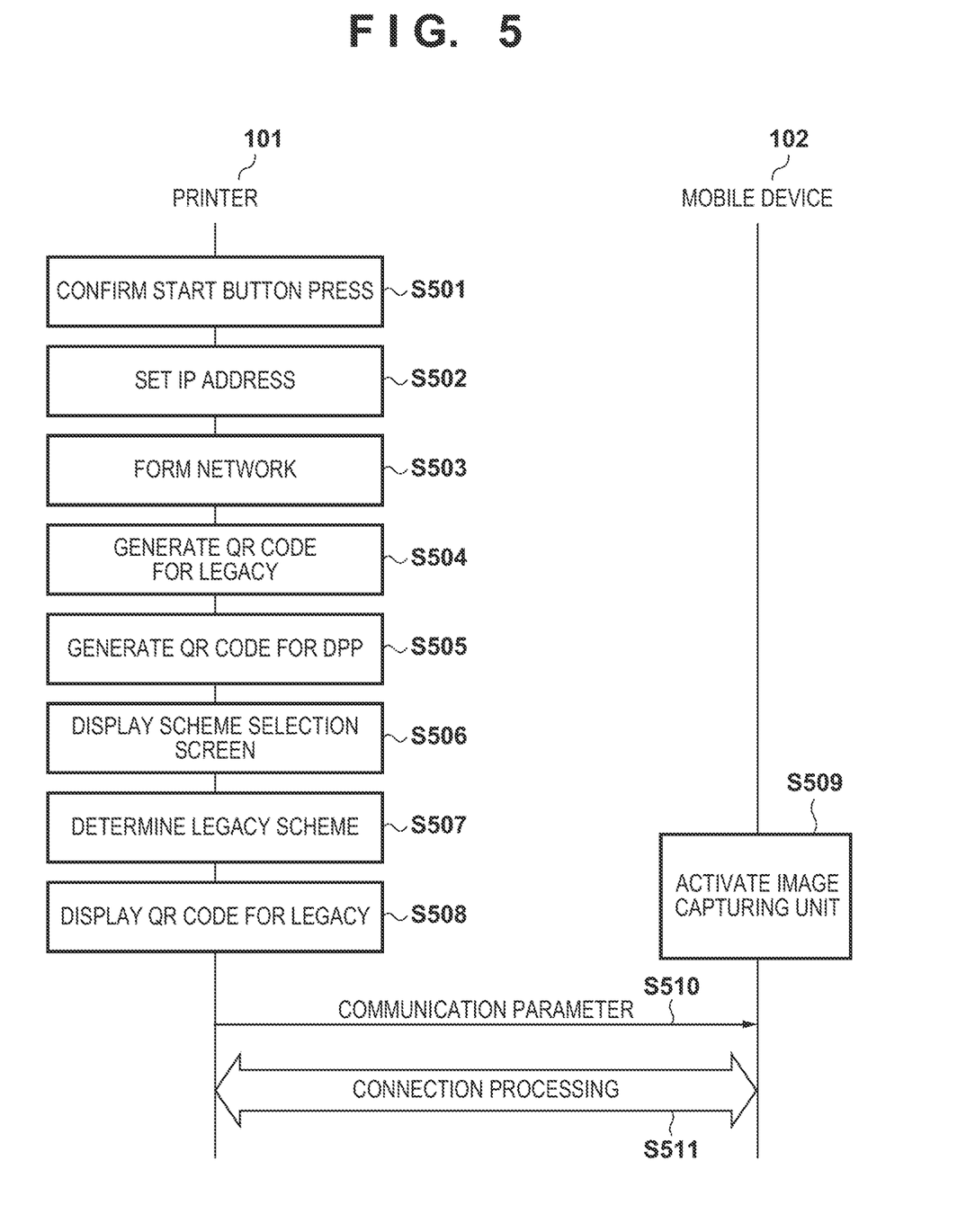
FIG. 5 is a sequence diagram illustrating setting processing in a legacy scheme.

FIG. 5 is a sequence diagram illustrating setting processing in a legacy scheme. Specifically, it illustrates processing in which the user selects the legacy scheme, the printer 101 displays the QR code image for the legacy scheme, and the mobile device 102 obtains communication parameters based on the legacy scheme, and connects to the wireless network 103.

The printer 101, when it confirms (step S501) that the button for starting processing for connecting to the wireless network was pressed by the user, sets (step S502) the IP address to the printer 101 itself, and forms (step S503) the wireless network 103.

After forming the wireless network 103, the printer 101 generates the QR code image for the legacy scheme and the QR code image for the DPP scheme (step S504 and step S505). After that, the printer 101 displays (step S506) a selection screen (screen 400a) for allowing the user to select which of the legacy scheme and the DPP scheme to connect by.

After displaying the selection screen, the printer 101 awaits the selection of the scheme by the user, determines (step S507) that the legacy scheme was selected by the user, and displays (step S508) the QR code image for the legacy scheme.

Meanwhile, when the mobile device 102 receives an instruction to connect to the wireless network 103 from the user, it activates (step S509) an image capturing unit such as a camera for capturing the QR code image. For example, when activation of a setting app is instructed by a user, the setting app activates a camera, and controls the camera in accordance with user operations to start capturing.

The user directs the imaging direction of the camera of the mobile device 102 towards the QR code image displayed on the printer 101 in step S508. The mobile device 102 decrypts (step S510) the QR code image when the QR code image is captured. The communication parameters for connecting to the wireless network 103 are included in the information that the QR code image decrypted in step S510 indicates.

The mobile device 102, by setting to the mobile device 102 itself the communication parameters obtained by decryption in step S510, connects (step S511) to the wireless network 103.

Figure 6:
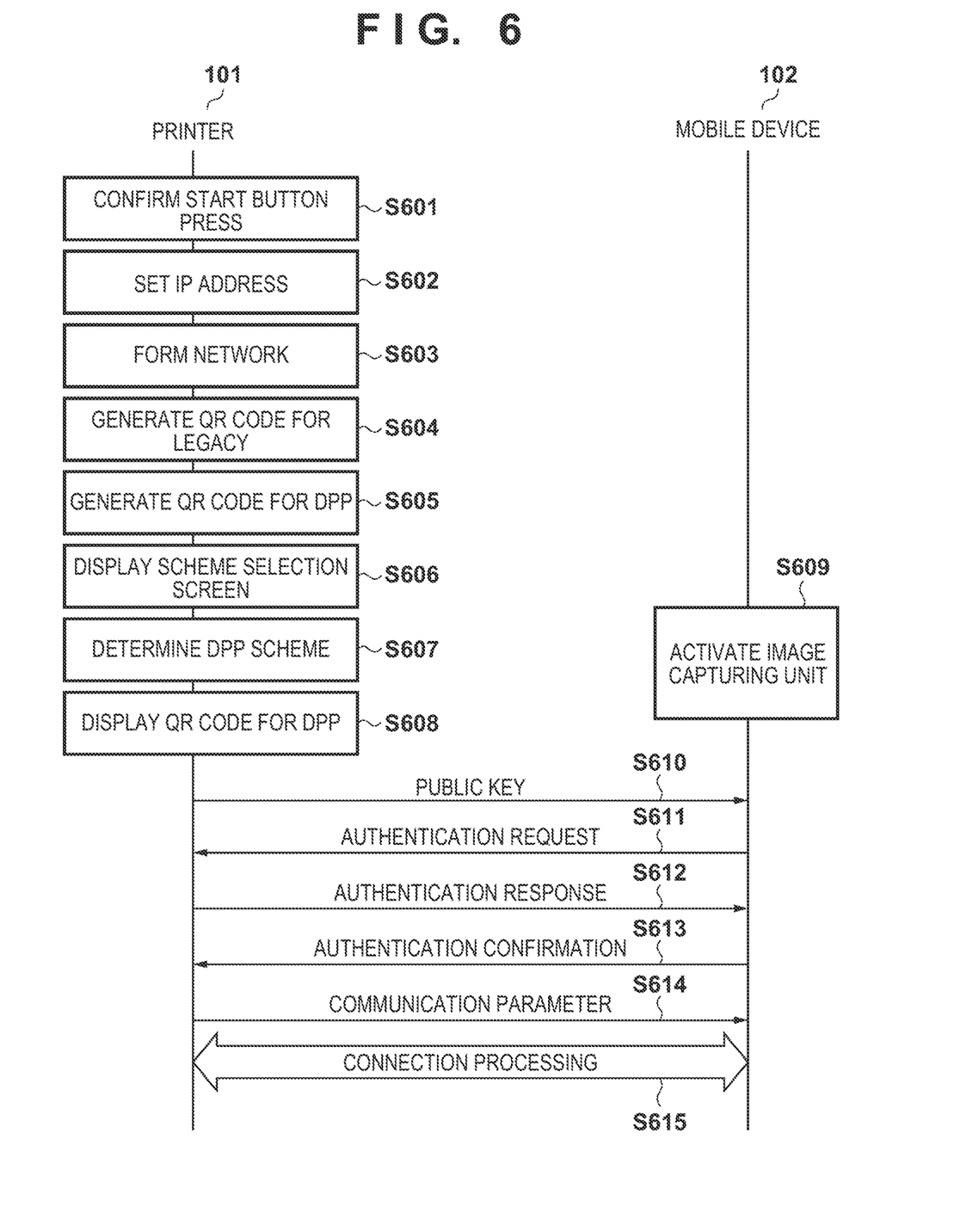
FIG. 6 is a sequence diagram illustrating setting processing in a DPP scheme.

FIG. 6 is a sequence diagram illustrating setting processing in the DPP scheme. Specifically, it illustrates processing in which the user selects the DPP scheme, the printer 101 displays the QR code image for the DPP scheme, and the mobile device 102 obtains communication parameters based on the DPP scheme, and connects to the wireless network 103.

The printer 101, when it confirms (step S601) that the button for starting processing for connecting to the wireless network was pressed by the user, sets (step S602) the IP address to the printer 101 itself, and forms (step S603) the wireless network 103.

After forming the wireless network 103, the printer 101 generates the QR code image for the legacy scheme and the QR code image for the DPP scheme (step S604 and step S605). After that, the printer 101 displays (step S606) a selection screen (screen 400a) for allowing the user to select which of the legacy scheme and the DPP scheme to connect by.

After displaying the selection screen, the printer 101 awaits the selection of the scheme by the user, determines (step S607) that the DPP scheme was selected by the user, and displays (step S608) the QR code image for the DPP scheme.

Meanwhile, when the mobile device 102 receives an instruction to connect to the wireless network 103 from the user, it activates (step S609) an image capturing unit such as a camera for capturing the QR code image. For example, when activation of a setting app is instructed by a user, the setting app activates a camera, and controls the camera in accordance with user operations to start capturing.

The user directs the imaging direction of the camera of the mobile device 102 towards the QR code image displayed on the printer 101 in step S608. The mobile device 102 decrypts (step S610) the QR code image when the QR code image is captured. Communication parameters for connecting to the wireless network 103 are not included in the information indicated by the QR code image that was decrypted in step S610, and a public key of the printer 101 to be used in the DPP scheme is included therein. The public key can be used for authenticating the printer 101 and encrypting the communication channel when providing the communication parameters.

The mobile device 102, after having obtained the public key of the printer 101, transmits (step S611) to the printer 101 an authentication request including a hash value of the public key of the printer 101 and the public key of the mobile device 102 itself.

The printer 101, after having received the authentication request, determines whether or not the apparatus that transmitted the authentication request is an apparatus that captured the QR code image. Here, a hash value of the public key included in the QR code image generated in step S605 is calculated. Then, the calculated hash value and the hash value included in the authentication request received in step S611 are compared. Then, in the case where the two match, the mobile device 102 that transmitted the authentication request is authenticated as an apparatus that captured the QR code image. After that, the printer 101 transmits (step S612) an authentication response indicating that the mobile device 102 was authenticated as an apparatus that captured the QR code image.

The mobile device 102, after having received the authentication response in step S612, confirms that it was authenticated by the printer 101, and transmits (step S613) an authentication confirmation to the printer 101.

The printer 101, after having received the authentication confirmation, generates a shared key using both the public key of the mobile device 102 received in step S611 and the private key of the printer 101 itself. Meanwhile, the mobile device 102, after having transmitted the authentication confirmation, generates a shared key using both the public key of the printer 101 obtained in step S610 and the private key of the mobile device 102 itself. Here, the shared key is envisioned as being generated based on ECDH (Elliptic Curve Diffie-Hellman), for example, but it may be generated based on another public key encryption scheme.

The printer 101 transmits (step S614) to the mobile device 102 the communication parameters after they are encrypted using the generated shared key. In other words, the communication parameters are transmitted via a communication channel that was encrypted using the generated shared key. Meanwhile, the mobile device 102 uses the generated shared key to decrypt the encrypted communication parameters. In other words, the communication parameters are received via a communication channel that was encrypted using the generated shared key.

The mobile device 102, by setting to the mobile device 102 itself the communication parameters obtained by decryption in step S614, connects (step S615) to the wireless network 103.

By virtue of the first embodiment as described above, the printer 101 selectively displays the QR code corresponding to the setting scheme that was designated by the user. Accordingly, without confusion, the user of the mobile device 102 can perform communication parameter setting on the mobile device 102 by capturing the single displayed QR code image by using the mobile device 102.

Another Example of Selection Screen

In step S306 described above, a selection screen (screen 400a) on which the user directly designates (selects) either "legacy scheme" or "DPP scheme" is displayed. However, configuration may be taken so as to accept information that is easy for the user to understand as the content accepted for the setting scheme. For example, configuration may narrow down the QR code image to be displayed to one according to a function that the mobile device 102 comprises. In the following description, a case in which the QR code image to display is selected depending on the version of the OS (Operating System) of the mobile device 102 as an example of a function that the mobile device 102 comprises will be described.

The OS of the mobile device 102 may be Android (registered trademark), for example. In the case where the version of the OS is old, there is the possibility that the mobile device 102 does not support the DPP setting scheme which is a relatively new scheme compared to the legacy scheme. In this case, even if the mobile device 102 captures the QR code image for the DPP scheme, it cannot connect to the wireless network 103. Accordingly, description is given of an embodiment in which the QR code image to be displayed is narrowed down to one based on the version of the OS installed in the mobile device 102.

Figure 7:
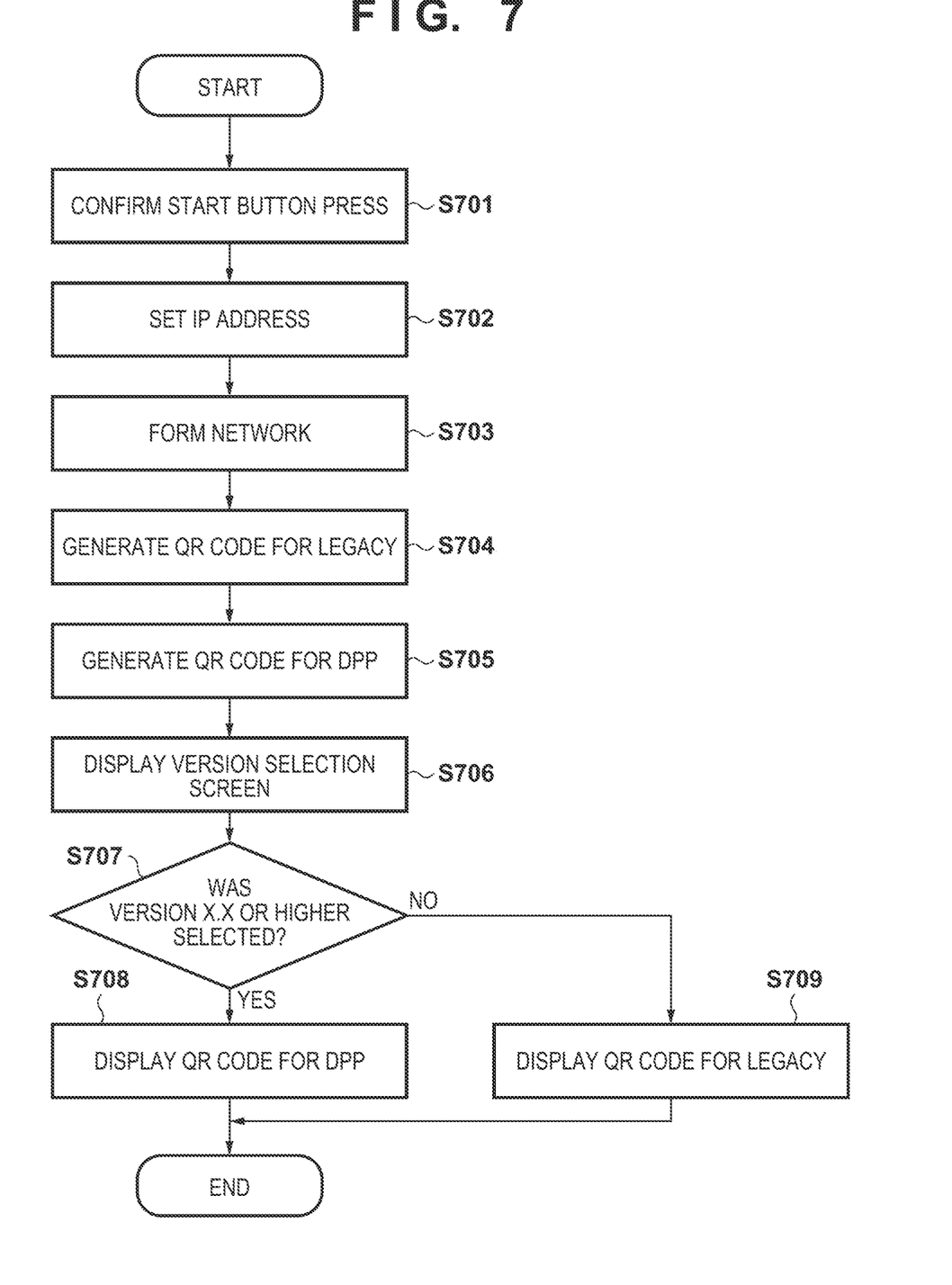
FIG. 7 is a flowchart of other QR code image display processing.

FIG. 7 is a flowchart of other QR code image display processing. Specifically, it is a flowchart that illustrates processing in which the QR code image to be displayed is narrowed down to one based on the version of the OS installed in the mobile device 102. The processing of step S701 to step S705 is similar to that of FIG. 3 (step S301 to step S305), and so description is omitted.

Figure 8:
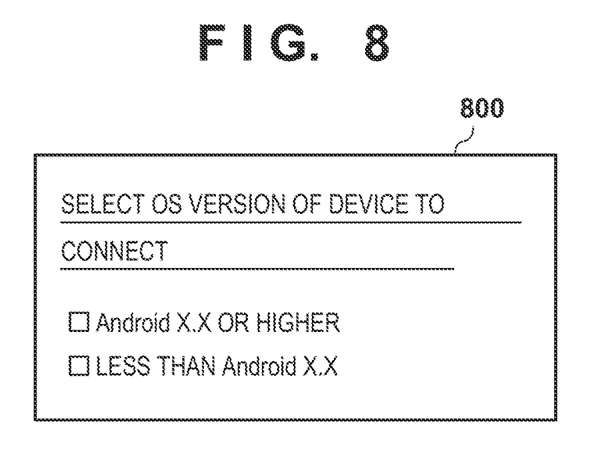
FIG. 8 is a view illustrating an example of an OS version selection screen.

In step S706, the printer 101 controls the display unit 204 to display a selection screen for allowing the user to select the version of the OS installed in the mobile device 102. FIG. 8 is the view for illustrating an example of a selection screen 800 of the OS version displayed on the display unit 204. The "X.X" in "AndroidX.X" is the version number, and a number such as "4.3" or "6.2", for example, is set in advance. Note that in the selection screen 800, a screen configuration is such that it accepts whether it is a preset version or higher, but it is also possible to use another screen configuration. For example, configuration may be such that the OS version is accepted via a numeric keypad or the like, and configuration may be taken such that the printer 101 determines whether or not the accepted OS version is a preset version or higher.

In step S707, the printer 101 determines which of "Android X.X or higher" and "less than Android X.X" was selected on the selection screen. In the case where "Android X.X or higher" is determined to be selected (YES in 707), the processing advances to step S708, and in the case where "less than Android X.X" is determined to be selected (NO in 707) the processing advances to step S709.

In step S708, the printer 101 controls the display unit 204 and displays on the display unit 204 the QR code image for the DPP scheme generated in step S705. Meanwhile, in step S709, the printer 101 controls the display unit 204 and displays on the display unit 204 the QR code image for the legacy scheme generated in step S704.

Note that, similarly to the case of the processing in FIG. 3, configuration may be taken to generate the QR code image after the determination processing in step S707 without generating the QR code images in step S704 and in step S705. Also, description was given using Android as the OS installed on the mobile device 102, but limitation is not made to this. For example, it may be Apple's (registered trademark) iOS.

Furthermore, the version of the setting app may be used in place of the OS version, and a combination of the OS version and the setting app version may be used. It is possible to display arbitrary function information by which the setting scheme can be specified as the selection screen (FIG. 8).

Second Embodiment

In the second embodiment, description is given of a case where when the mobile device 102 starts setting of communication parameters, the printer 101 has already formed the wireless network 103. For example, this is a state in the case where the mobile device 102, after having connected to the printer 101 in accordance with FIG. 5 or FIG. 6, first disconnects and then reconnects, a case where another mobile device newly connects, or the like.

The system configuration and apparatus configuration are similar to in the first embodiment (FIG. 1 and FIG. 2), and therefore description thereof is omitted. However, the scheme determination unit 208, in addition to determining the setting scheme described in the first embodiment, further has a function for determining what setting scheme the QR code image that displayed when the wireless network 103 was formed was for.

Apparatus Operation

Figure 9:
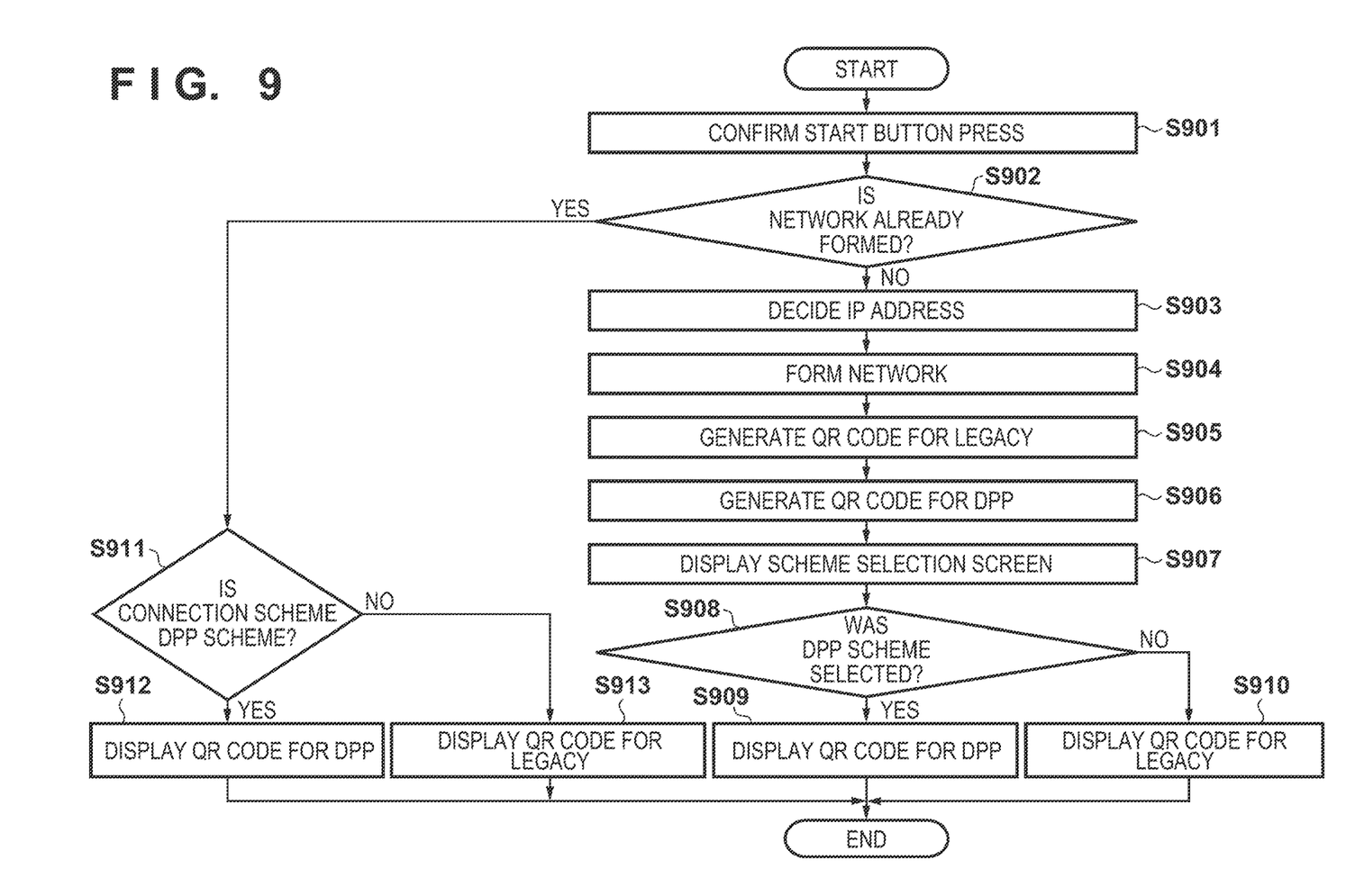
FIG. 9 is a flowchart of QR code image display processing in a second embodiment.

FIG. 9 is a flowchart of QR code image display processing in a second embodiment. The processing of step S901 and step S903 to step S910 is similar to that of FIG. 3 (step S301 and step S302 to step S309), and so description is omitted.

In step S902, the printer 101 determines whether or not the wireless network 103 is already formed. When it determines that the wireless network 103 is not yet formed (NO in step S902), the processing advances to step S903, and when it determines that the wireless network 103 is already formed (YES in step S902), the processing advances to step S911.

In step S911, the printer 101 determines which of the legacy scheme and the DPP scheme the QR code image was displayed for when the wireless network 103 was formed. In the case where a QR code image for the DPP scheme is determined to have been displayed (YES in step S911), the processing advances to step S912, and in the case where the QR code image for the legacy scheme is determined to have been displayed (NO in step S911), the processing advances to step S913.

In step S912, the printer 101 controls the display unit 204 and displays on the display unit 204 the QR code image for the DPP scheme. Meanwhile, in step S913, the printer 101 controls the display unit 204 and displays on the display unit 204 the QR code image for the legacy scheme.

Note that for the QR code images displayed in step S912 and in step S913, it is possible to use the same QR code images that were generated in step S905 and in step S906 when forming the wireless network 103. However, configuration may be taken to generate them newly after the determination in step S911. For example, by generating the QR code image after the determination in step S911, it ceases to be necessary to continue to hold the QR code image after forming the wireless network and it is possible to reduce the storage capacity.

As described above, by virtue of the second embodiment, the printer 101, in the case where the wireless network 103 has already been formed, the QR code image for the setting scheme used when forming the wireless network 103 is displayed. Accordingly, without getting confused, the user of the mobile device 102 can perform communication parameter setting on the mobile device 102 by capturing the one displayed QR code image by using the mobile device 102.

Note that here the printer 101 is envisioned to continue to maintain the network 103 formed in accordance with FIG. 5 and FIG. 6 until the power supply of the printer 101 is turned off. However, configuration may be such that in the case where the communication with the mobile device 102 is not performed for a fixed amount of time, the formation of the network 103 is ended. Note that in a case where an instruction for starting setting after ending the formation of the network 103, and it is determined that the wireless network 103 has not yet been formed (NO in step S902), the processing advances to step S903.

Variation

In the respective embodiments described above, a barcode or a two-dimensional code may be used rather than a QR code image. Also, instead of displaying an encoded image suitable for reading by a computer, display in a format (such as ASCII characters) that a user can easily understand may be performed. The means for reading such information is not limited to a camera for capturing the QR code, and a reader apparatus comprising a function for reading various codes may be used.

Also, a case in which wireless LAN communication conforming to the IEEE 802.11 series as the wireless communication standard is performed was described, but there is no limitation to this. For example, a wireless communication medium such as a wireless USB, MBOA Bluetooth (registered trademark), UWB, ZigBee, NFC or the like may be used for implementation thereof. Here, MBOA is an abbreviation of Multi Band OFDM Alliance. Furthermore, in UWB, wireless USB, wireless 1394, WINET, and the like are included.

Also, a case in which communication parameters for connecting to a wireless LAN access point are provided was described, but limitation is not made thereto. For example, configuration may be taken such that communication parameters for connecting to a Wi-Fi Direct P2P Group Owner are provided.

Furthermore, while description of a form in which a single wireless network of the printer 101 is formed in each above-described embodiment was given, configuration may be taken to form a plurality of wireless networks. For example, configuration may be taken to form two wireless networks: a wireless network that can be connected to by obtaining information of a QR code image for the DPP scheme and a wireless network that can be connected to by obtaining information of a QR code image for the legacy scheme.

Also, in the selection screen displayed in step S306/step S706/step S907, a selection item for displaying both of the two types of QR code image may be provided. A screen 400b illustrated in FIG. 4 is an example of a selection screen that is displayed on the display unit 204, and on which a "skip" button is provided newly with respect to the screen 400a. By the user selecting the "skip" button, two QR code images are displayed on the display unit 204. Alternatively, configuration may be taken to automatically display two QR code images on the display unit 204 in the case where a predetermined amount of time is waited on the screen 400a and there was no selection input by the user.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-246401, filed Dec. 22, 2017 which is hereby incorporated by reference herein in its entirety.

What is claimed is:

1. A communication apparatus operable to provide a communication parameter to an external apparatus, comprising:
one or more processors; and
one or more memories including instructions that, when executed by the one or more processors, cause the communication apparatus to:
generate a first image that is used in a first setting scheme for providing a communication parameter and in which information including a communication parameter used for communication with the communication apparatus is encoded;
generate a second image that is used in a second setting scheme for providing a communication parameter and in which information that does not include the communication parameter used for communication with the communication apparatus and that does include a public key of the communication apparatus is encoded;
accept information related to an Operating System (OS) of the external apparatus;
cause a display device to display, based on the information accepted by the communication apparatus, at least one of the first image and the second image;
execute, in a case where the second image is displayed and the communication apparatus receives information related to the public key for the communication apparatus and a public key for the external apparatus, an authentication process by using the received information relating to the public key for the communication apparatus; and
provide, in a case where the external apparatus authenticated by the authentication process using the received information related to the public key for the communication apparatus, the communication parameter by using a shared key generated using the public key for the external apparatus and a secret key for the communication apparatus to the external apparatus.

2. The communication apparatus according to claim 1, wherein
the communication apparatus accepts information based on a selection by a user indicating a version of the OS of the external apparatus.

3. The communication apparatus according to claim 1, wherein the execution of the instructions further causes the communication apparatus to:
form a wireless network; and the communication parameter is a parameter for connecting to the wireless network.

4. The communication apparatus according to claim 3, wherein
the communication parameter includes an SSID of the wireless network formed by the communication apparatus.

5. The communication apparatus according to claim 3, wherein the execution of the instructions further causes the communication apparatus to:
determine whether or not the communication apparatus has already formed a wireless network; and
in a case where the communication apparatus is determined to have already formed a wireless network, the communication apparatus causes the display device to display the first image or the second image which was displayed when the already formed wireless network was formed.

6. The communication apparatus according to claim 1, wherein
the communication apparatus provides the communication parameter encrypted by the shared key to the external apparatus.

7. The communication apparatus according to claim 1, wherein
the second setting scheme is a setting scheme complies to Device Provisioning Protocol.

8. The communication apparatus according to claim 1, wherein
the communication apparatus holds the display device.

9. A method for controlling a communication apparatus operable to provide a communication parameter to an external apparatus, the method comprising:
generating a first image that is used in a first setting scheme for providing a communication parameter and in which information including a communication parameter used for communication with the communication apparatus is encoded;
generating a second image that is used in a second setting scheme for providing a communication parameter and in which information that does not include the communication parameter used for communication with the communication apparatus and that does include a public key of the communication apparatus is encoded;
accepting information related to an Operating System (OS) of the external apparatus;
based on the accepted information, displaying at least one of the first image and the second image;
executing, in a case where the second image is displayed and the communication apparatus receives information related to the public key for the communication apparatus and a public key for the external apparatus, an authentication process by using the received information relating to the public key for the communication apparatus; and
providing, in a case where the external apparatus authenticated by the authentication process using the received information related to the public key for the communication apparatus, the communication parameter by using a shared key generated using the public key for the external apparatus and a secret key for the communication apparatus to the external apparatus.

10. A non-transitory computer-readable recording medium storing a program that, when executed by a computer, causes the computer to:

generate a first image that is used in a first setting scheme for providing a communication parameter and in which information including a communication parameter used for communication with the communication apparatus is encoded;

generate a second image that is used in a second setting scheme for providing a communication parameter and in which information that does not include the communication parameter used for communication with the communication apparatus and that does include a public key of the communication apparatus is encoded;

accept information related to an Operating System (OS) of the external apparatus;

cause a display device to display, based on the information accepted by the communication apparatus, at least one of the first image and the second image;

execute, in a case where the second image is displayed and the communication apparatus receives information related to the public key for the communication apparatus and a public key for the external apparatus, an authentication process by using the received information relating to the public key for the communication apparatus; and provide, in a case where the external apparatus authenticated by the authentication process using the received information related to the public key for the communication apparatus, the communication parameter by using a shared key generated using the public key for the external apparatus and a secret key for the communication apparatus to the external apparatus.

* * * * *